(12) United States Patent
Neuwirth

(10) Patent No.: US 6,213,255 B1
(45) Date of Patent: Apr. 10, 2001

(54) ADJUSTING DEVICE FOR DISK BRAKES

(75) Inventor: Ernst Neuwirth, Herzogenaurach (DE)

(73) Assignee: INA Walzlager Schaeffler oHG (DE)

( * ) Notice: Subject to any disclaimer, the term of this patent is extended or adjusted under 35 U.S.C. 154(b) by 0 days.

(21) Appl. No.: 09/268,530

(22) Filed: Mar. 12, 1999

(30) Foreign Application Priority Data

Apr. 2, 1998 (DE) ............................................. 198 14 807

(51) Int. Cl.⁷ .................................................... F16D 55/02
(52) U.S. Cl. ......................................................... 188/71.9
(58) Field of Search ........................ 188/71.9, 79, 78.55, 188/79.62, 71.7, 196 R, 196 V

(56) References Cited

U.S. PATENT DOCUMENTS 5,353,896 * 10/1994 Baumgartner ........................ 188/71.9
5,568,845 * 10/1996 Baumgartner ........................ 188/71.9

FOREIGN PATENT DOCUMENTS 4212406  10/1993 (DE) .
0614025  9/1994 (EP) .

* cited by examiner

Primary Examiner—Christopher P. Schwartz
Assistant Examiner—C. T. Bartz
(74) Attorney, Agent, or Firm—Bierman, Muserlian and Lucas

(57) ABSTRACT

An adjusting device for disk brakes for compensating a play caused by wear comprises a support (6) received in a brake caliper (2) for displacement transversely of the brake disk (1), an adjusting spindle (7, 8) being arranged for rotation and axial displacement in the support (6), said adjusting spindle comprising, on one end, a brake lining carrier (9) equipped with a brake lining (10), and said adjusting spindle being connected rotationally fast and axially displaceable to a shaft (17) which is engaged by a lever (15) via a clamping roller overrunning clutch (21) for transmission of an adjusting moment whereby an axially pre-tensioned coiled compression spring (22) is arranged crosswise to the turning direction of the lever (15) and is supported at one end on the lever (15) and at a second end on a stationary element (23).

5 Claims, 2 Drawing Sheets

ADJUSTING DEVICE FOR DISK BRAKES

FIELD OF THE INVENTION

Figure 1:
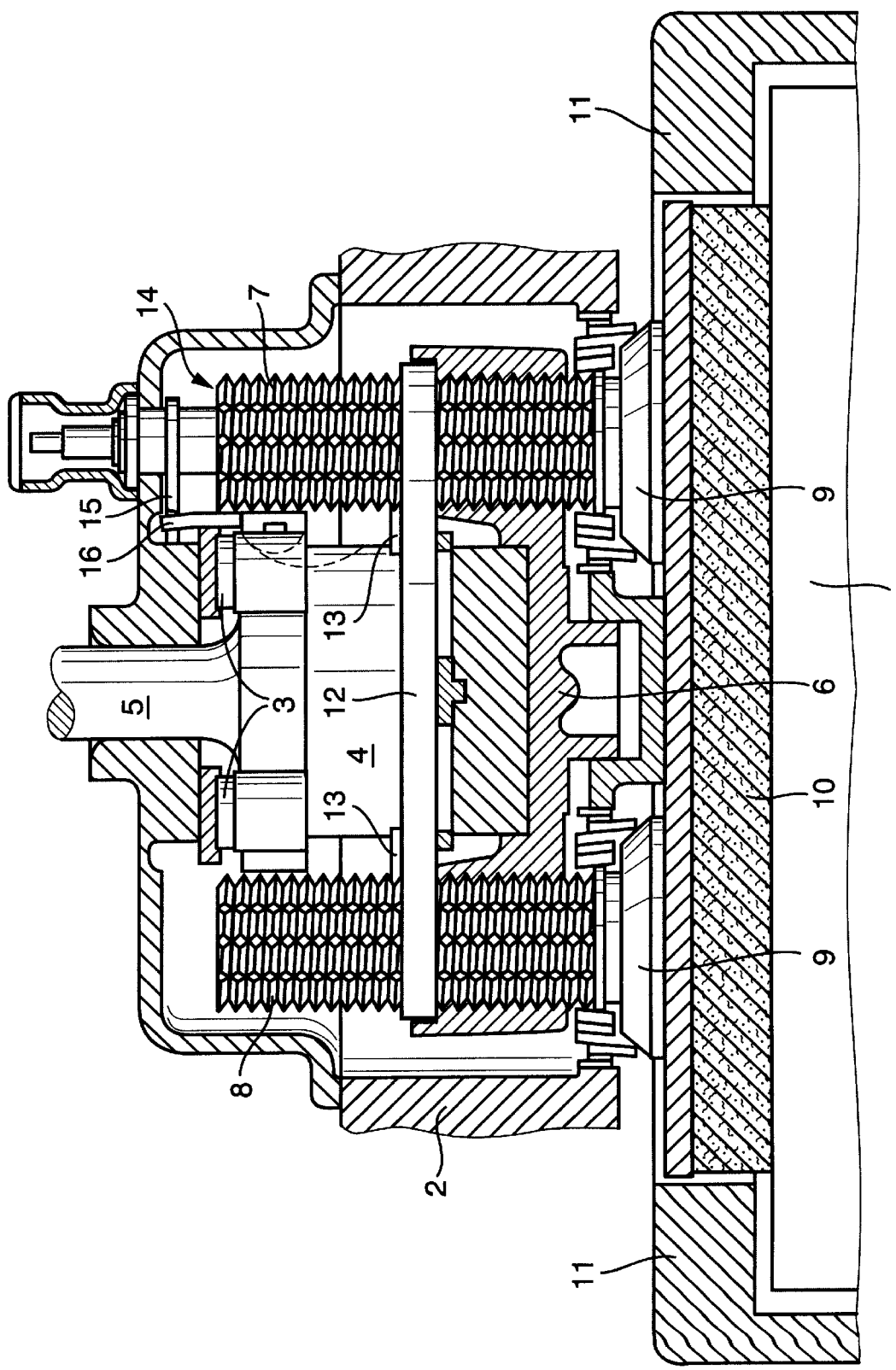

An adjusting device for disk brakes for compensating play caused by abrasion which play results from a wear of the brake linings whereby an adjustment guarantees a quick reaction of the brakes upon actuation.

BACKGROUND OF THE INVENTION

An automotive vehicle disk brake comprising such an adjusting device is known from EP 0 531 321 B1. A cross arm displaceable transversely of the brake caliper is received in the brake caliper, and rotatable adjusting spindles which can be displaced axially in the manner of a screw-and-nut joint are arranged in the cross arm. The adjusting spindles are equipped at one end with thrust members which press the brake lining against the brake disk upon an axial displacement of the adjusting spindles. A shaft arranged in one of the adjusting spindles is connected rotationally fast and axially displaceable with this adjusting spindle. The shaft is composed of two parts arranged axially behind each other, and between these two parts is disposed a torque limiting device. The value of a torque transmitted from one of these parts to the other through a lever is limited by this torque limiting device. The lever is mounted via an overrunning clutch on one of the parts composing the shaft.

To compensate for play caused by wear, a drive force applied to the lever is transmitted to the shaft as a torque. This torque is introduced through the coupled overrunning clutch into the shaft and from there into the adjusting spindle which rotates under this load. Due to its rotation, the threaded spindle is simultaneously displaced axially, causing the brake linings to move in the direction of the brake disk. To prevent an unintended pivoting of the lever, for example under the influence of vibrations, there is provided an ondular spring which is supported at one end on the lever or on a machine element connected rotationally fast to the lever, and at the other end on the stationary element. Thus, a moment of friction is transferred between the stationary element and the lever through the ondular spring. This moment of friction prevents unintended pivoting of the lever in both directions of pivot.

For example, in one of the directions of pivot, an undesired additional displacement of the brake linings toward the brake disk as a result of adjusting movements of the adjusting spindles is prevented in this way. Ondular springs or even disk springs are characterized by very short spring travel. For instance, when such springs set or when the contact surfaces of the springs undergo wear, it is possible for these springs to relax to such an extent that no adequate biasing can be maintained. This reduced biasing can lead to the aforesaid unintended pivoting movements of the lever.

OBJECTS OF THE INVENTION

It is therefore an object of the invention to improve a generic adjusting device for disk brakes to exclude unintended adjusting movements of the lever.

This and other objects and advantages of the invention will become obvious from the following detailed description.

SUMMARY OF THE INVENTION

In the disk brake adjusting device of the invention, an axially pre-tensioned coiled compression spring is arranged crosswise to the direction of rotation of the lever and is supported at one end on the lever and at the other end on a stationary element. The advantage of coiled compression springs over disk springs or ondular springs is that the spring rate can be considerably reduced. The result of this is that the biasing force remains sufficiently strong even after a setting of the coiled compression spring or after wear of the contact surfaces or in the presence of tolerance variations of the spring and the connecting elements which determine the design space available for the spring. It is thus possible to maintain a required moment of static friction permanently between the stationary element and the lever without any problem. The coiled compression spring is designed so as to guarantee a perfect exclusion of unintended additional adjusting movements.

According to another proposition of the invention, a conical coiled compression spring is arranged coaxially to the shaft with one of its ends being supported on the stationary element and the other on the lever. Conical coiled compression springs have further advantages for the present use. First of all, the cone angle can be chosen so that, when the coiled compression spring is pre-tensioned into a block, the individual spring coils overlap one another in axial direction so that the overall axial dimension of the conical coiled compression spring is very short. This is not possible in the case of cylindrical coiled compression springs.

If the coiled compression spring is fixed rotationally fast by one of its ends to the lever, it is particularly advantageous to support the wider diameter end of the conical coiled compression spring on the stationary element. The last coil at the wider end has a distinctly larger contact and friction surface for cooperation with the stationary element than the narrower end of the conical coiled compression spring. Besides this, it is possible to configure the lever arm formed between this contacting coil and the axis of pivot so that relatively large moments of static friction can be obtained without undesired adjusting movements of the lever. Advantageously, the stationary element is provided with a friction surface for cooperating with the contacting end of the conical coiled compression spring.

BRIER DESCRIPTION OF THE DRAWINGS

The invention is described more closely in the following with reference to an example of embodiment represented in two figures.

Figure 2:
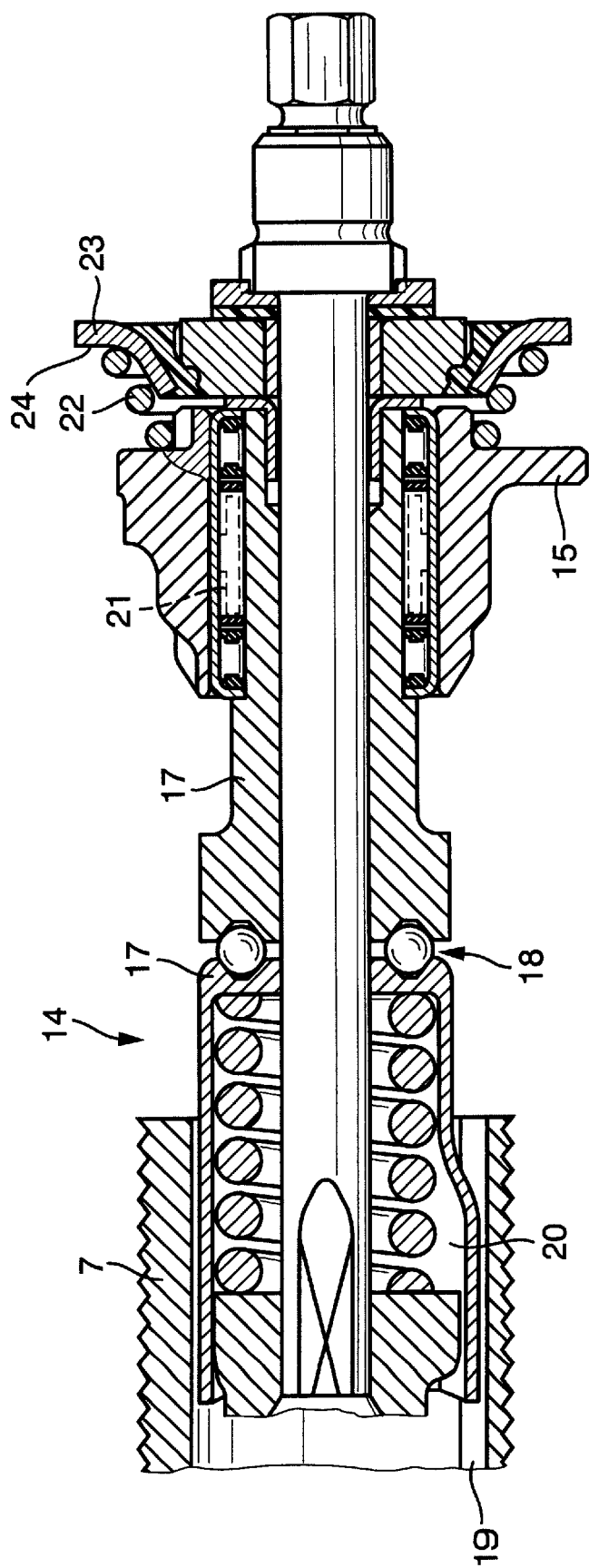

FIG. 1 is a sectional view of a brake caliper for a disk brake having two threaded spindles coupled by a synchronizing device, and FIG. 2 shows a threaded spindle equipped with an adjusting device of the invention.

DETAILED DESCRIPTION OF THE DRAWINGS

FIG. 1 shows a brake disk 1 which is overlapped by a brake caliper 2 of which only one part situated on one side of the brake disk 1 and receiving the brake adjusting device is represented. A cam lever 4 is mounted in the brake caliper 2 with the help of approximately semi-shell-shaped rolling bearings 3 to pivot about an axis of pivot extending parallel to the plane of the brake disk 1. The cam lever 4 is driven by a lever 5 whose end can be coupled to a piston of a brake cylinder supported on the brake caliper 2, or to a mechanical brake linkage. The cam lever 4 is coupled by its cam to a cross arm 6 which extends parallel to the plane of the brake disk 1 within the brake caliper 2 and is displaceable vertically of this plane. The two ends of the cross arm 6 are adjustably screwed to respective adjusting spindles 7,8. The two adjusting spindles 7 and 8 extend vertically of the plane of the brake disk 1 within the brake caliper 2 and are equipped, at their ends facing the brake disk 1, with thrust members 9.

A brake lining 10 adapted to be pressed against the brake disk 1 bears against the thrust members 9. The two adjusting spindles 7 and 8 comprise an axial toothing which intersects the thread of the spindle. A toothed belt 12 engaging this axial toothing couples the adjusting spindles 7 and 8 rotationally fast to each other. Retaining elements 13 for guiding the toothed belt 12 are arranged on the cross arm 6. The adjusting spindle 7 is equipped with a rotary drive 14 which is arranged substantially in an axial recess of the adjusting spindle 7, which recess is open in a direction opposed to the brake disk 1. The rotary drive 14 carries a radially projecting drive lever 15 whose free end cooperates with a stop pin 16.

FIG. 2 shows a longitudinal section of the rotary drive 14. A shaft 17 is composed of two parts arranged axially behind each other with a torque limiting device 18 arranged between these two parts. One of the two parts of the shaft 17 is partially inserted into the adjusting spindle 7 which comprises at least one axial groove 19 which is engaged by a projection 20 of the drive shaft 17. The lever 15 is mounted on the shaft 17 by a clamping roller overrunning clutch 21. A conical coiled compression spring 22 is arranged coaxially around the shaft 17 with the last coil at one end of the spring bearing against the lever 15 and the last coil at the other end of the spring bearing against a stationary element 23. The wider end of the conical coiled compression spring 22 faces the stationary element 23. The contact surface for the conical coiled compression spring 22 on the stationary element 23 is configured as a friction surface 24.

For compensating the play caused by wear, the lever 15 is turned in a direction of adjustment and this turning motion is transmitted through the coupled clamping roller overrunning clutch 21 to the shaft 17 which introduces it into the adjusting spindle 7. The adjusting spindle 7 now rotates relative to the cross arm 6 and this results in an axial displacement of the adjusting spindle 7 which causes an adjusting movement of the brake lining 10 towards the brake disk 1. An unintended pivoting of the lever 15 is prevented by the conical coiled compression spring 22. The end of the conical coiled compression spring 22 bearing against the lever 15 may be positively engaged with the lever 15.

Various modifications of the adjusting device of the invention may be made without departing from the spirit or scope thereof and it is to be understood that the invention is intended to be limited only as defined in the appended claims.

What is claimed is:

1. An adjusting device for disk brakes for compensating a play caused by wear, said adjusting device comprising a support (6) received for displacement transversely of a brake disk (1), an adjusting spindle (7, 8) being arranged for rotation and axial displacement in the support (6), said adjusting spindle comprising, on one end, a brake lining carrier (9) equipped with a brake lining (10), and said adjusting spindle being connected rotationally fast and axially displaceable to a shaft (17) which is engaged by a lever (15) via a clamping roller overrunning clutch (21), for transmission of an adjusting moment, characterized in that an axially pre-tensioned coiled compression spring (22) is arranged crosswise to a turning direction of the lever (15) and is supported at one end on the lever (15) and at a second end on a stationary element (23).

2. An adjusting device of claim 1 wherein a conical coiled compression spring (22) is arranged coaxially to the shaft (17) and is supported at one end on the stationary element (23) and at the second end on the lever (15).

3. An adjusting device of claim 2 wherein a larger diameter end of the conical coiled compression spring (22) is supported on the stationary element (23).

4. An adjusting device of claim 2 wherein the stationary element (23) comprises a friction surface (24) for the end of the conical coiled compression spring (22) in contact therewith.

5. An adjusting device of claim 1 wherein the coiled compression spring (22) is connected rotationally fast to the lever (15) or to the stationary element (23).

\* \* \* \* \*